United States Patent
Usui et al.

(10) Patent No.: US 10,858,583 B2
(45) Date of Patent: Dec. 8, 2020

(54) PHOSPHOR AND METHOD OF PRODUCING THE SAME

(71) Applicants: KABUSHIKI KAISHA TOSHIBA, Tokyo (JP); TOSHIBA MATERIALS CO., LTD., Yokohama (JP)

(72) Inventors: Daichi Usui, Kawasaki (JP); Hirofumi Takemura, Kamakura (JP); Naotoshi Matsuda, Chigasaki (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 345 days.

(21) Appl. No.: 16/025,188

(22) Filed: Jul. 2, 2018

(65) Prior Publication Data

US 2018/0305615 A1 Oct. 25, 2018

Related U.S. Application Data

(63) Continuation of application No. PCT/JP2017/003438, filed on Jan. 31, 2017.

(30) Foreign Application Priority Data

Feb. 2, 2016 (JP) ................................. 2016-017977

(51) Int. Cl.
  *C09K 11/77* (2006.01)
  *C01F 17/30* (2020.01)

(52) U.S. Cl.
  CPC .......... *C09K 11/7789* (2013.01); *C01F 17/30* (2020.01); *C09K 11/7767* (2013.01); *C09K 11/7771* (2013.01); *C09K 11/7784* (2013.01); *C01P 2002/50* (2013.01); *C01P 2002/54* (2013.01); *C01P 2006/80* (2013.01)

(58) Field of Classification Search
  CPC ............ C09K 11/7789; C09K 11/7771; C09K 11/7767; C09K 11/7784
  See application file for complete search history.

(56) References Cited

U.S. PATENT DOCUMENTS

| | | | | |
|---|---|---|---|---|
| 3,981,819 A | * | 9/1976 | Yocom .............. | C09K 11/0822 252/301.4 S |
| 7,221,473 B2 | * | 5/2007 | Jeran ..................... | G06K 15/00 347/12 |
| 7,888,650 B2 | * | 2/2011 | Matsuda ............ | C09K 11/7768 250/370.11 |
| 8,283,848 B2 | * | 10/2012 | Matsuda ............... | H05B 33/14 313/503 |
| 2006/0145085 A1 | | 7/2006 | Fukuta et al. | |
| 2008/0179532 A1 | | 7/2008 | Matsuda | |
| 2011/0050089 A1 | | 3/2011 | Matsuda | |

FOREIGN PATENT DOCUMENTS

| | | |
|---|---|---|
| CN | 101104746 A | 1/2008 |
| GB | 1522368 * | 8/1978 |
| JP | 2008-208328 A1 | 9/2008 |
| JP | 2010-059429 A1 | 3/2010 |
| JP | 2011-052156 A1 | 3/2011 |
| WO | 2005/028591 A1 | 3/2005 |

OTHER PUBLICATIONS

V. Jary, et al., "Optical Properties of $Ce^{3+}$-Doped $KLuS_2$ Phosphor," *Journal of Luminescence*, vol. 147 (2014), pp. 196-201.
Extended European Search Report (Application No. 17747412.9) dated Aug. 28, 2019.
Yi Ding, et al., "Chemoaffinity-Mediated Synthesis of $NaRES_2$-Based Nanocrystals as Versatile Nano-Building Blocks and Durable Nano-Pigments," *Journal of the American Chemical Society*, Jan. 16, 2012, 134, pp. 3255-3264.
International Search Report and Written Opinion (Application No. PCT/JP2017/003438) dated Apr. 4, 2017.

* cited by examiner

*Primary Examiner* — C Melissa Koslow
(74) *Attorney, Agent, or Firm* — Burr & Brown, PLLC

(57) ABSTRACT

A phosphor of an embodiment has a composition represented by a composition formula: $Na_xRM_yS_zO_a$, where R represents at least one element selected from the group consisting of Y, La, Gd, and Lu, M represents at least one element selected from the group consisting of Bi, Ce, Eu, and Pr, x is an atomic ratio satisfying $0.93<x<1.07$, y is an atomic ratio satisfying $0.00002<y<0.01$, z is an atomic ratio satisfying $1.9<z<2.1$, and a is an atomic ratio satisfying $0.001<a<0.05$.

11 Claims, No Drawings

PHOSPHOR AND METHOD OF PRODUCING THE SAME

CROSS-REFERENCE TO RELATED APPLICATIONS

This application is a continuation of prior International Application No. PCT/JP2017/003438, filed on Jan. 31, 2017 which is based upon and claims the benefit of priority from Japanese Patent Application No. 2016-017977, filed on Feb. 2, 2016; the entire contents of all of which are incorporated herein by reference.

FIELD

Embodiments described herein generally relate to a phosphor and a method of producing the same.

BACKGROUND

A $NaGdS_2$-based phosphor (sodium-rare earth sulfide-based phosphor) activated with Bi, Ce, Eu or the like is known as an X-ray detector scintillator material (phosphor material that converts X-rays into visible light), a red phosphor or a blue phosphor of display devices, and the like. One of the methods to produce such a phosphor is a method to cause a reaction of sulfides of the respective metal elements. The method using the sulfides has advantages of little mixture of oxygen as impurities and easy production. However, high-purity sulfide materials are not usually easily available, and the mixture of impurities makes it difficult to improve emission intensity.

Another method capable of producing the $NaGdS_2$-based phosphor is to use oxide-based raw materials which are easily available with a relatively high purity and sulfurize them by burning in hydrogen sulfide. The production method using the oxide-based raw materials is suitable for small-amount trial manufacture, but in the production of a large amount of phosphors, this method has disadvantages that due to difficulty in controlling an amount of residual oxygen derived from the oxide-based materials, a relatively large amount of oxygen is likely to remain, and due to this, grain growth is likely to be insufficient. These will be factors to reduce emission intensity. This has given rise to a demand for a sodium-rare earth sulfide-based phosphor whose emission intensity is improved by enhancing controllability of an amount of residual oxygen and so on, and a production method that is capable of relatively easily producing a large amount of such phosphors.

DETAILED DESCRIPTION

Hereinafter, embodiments of the phosphor of the present invention and the method of producing the same will be described.

A phosphor of an embodiment has a composition represented by a composition formula:

where R represents at least one element selected from the group consisting of Y, La, Gd, and Lu, M represents at least one element selected from the group consisting of Bi, Ce, Eu, and Pr, x is an atomic ratio satisfying 0.93<x<1.07, y is an atomic ratio satisfying 0.00002<y<0.01, z is an atomic ratio satisfying 1.9<z<2.1, and a is an atomic ratio satisfying 0.001<a<0.05.

A production method of an embodiment is a method of producing the phosphor of the embodiment, the method including: preparing a raw material mixture by mixing at least one first compound selected from the group consisting of an oxide, an oxoacid, and a halide of sodium, at least one second compound selected from the group consisting of an oxide, an oxoacid, and a halide of the element R, and at least one third compound selected from the group consisting of an oxide, an oxoacid, and a halide of the element M, at such a desired ratio for the resultant phosphor to have the composition represented by the composition formula; producing a first burned product by burning the raw material mixture, which is filled in a boron nitride vessel, in a hydrogen sulfide atmosphere at a temperature of 1000° C. or lower; and producing a second burned product as the phosphor by burning the first burned product, which is filled in a quartz glass vessel, in a hydrogen sulfide atmosphere at a temperature that is equal to or higher than 900° C. and is higher than the burning temperature of the first burning.

(Phosphor)

A phosphor of an embodiment has a composition represented by a composition formula:

where R represents at least one element selected from a group consisting of Y, La, Gd, and Lu, M represents at least one element selected from a group consisting of Bi, Ce, Eu, and Pr, x represents an atomic ratio satisfying 0.93<x<1.07, y represents an atomic ratio satisfying 0.00002<y<0.01, z represents an atomic ratio satisfying 1.9<z<2.1, and a represents an atomic ratio satisfying 0.001<a<0.05.

The phosphor of the embodiment is a phosphor ($NaRS_2$:$M_y$) whose host material having a basic composition of $NaRS_2$ contains a trace of an activating element M, with the content a of oxygen therein being regulated and stipulated. In the composition formula (1), Na and the element R are elements constituting the phosphor host material. The element R is at least one element selected from a group consisting of yttrium (Y), lanthanum (La), gadolinium (Gd), and lutetium (Lu), and the use of such a rare earth element R makes it possible to form the phosphor host material having excellent emission intensity. The element R preferably contains at least gadolinium, in which case, the emission intensity of the phosphor can be increased. The element R is more preferably gadolinium.

The element M is the activating element and is at least one element selected from a group consisting of bismuth (Bi), cerium (Ce), europium (Eu), and praseodymium (Pr). The phosphor whose host material having the basic composition of $NaRS_2$ contains a trace of such an activating element M is capable of functioning as a phosphor material that converts a high-energy ray such as an X-ray or an electron beam into visible light or as a phosphor material that converts light in an ultraviolet region to a purple region or a blue region into visible light having a longer wavelength (red light or blue light).

In the phosphor of the embodiment, the composition of its host material is not limited to $NaRS_2$. In an actual phosphor substance, a slight deviation from the stoichiometric composition ratios can easily occur. However, too large a deviation of ratios of the respective elements from the stoichiometric composition ratios leads to deterioration in properties as the phosphor. In the composition formula (1), with an atomic ratio of the element R being 1, it is preferable that the atomic ratio x of the sodium is within the range of 0.93<x<1.07, and the ratio z of the sulfur (S) is within the range of $1.9<z<2.1$. The phosphor containing such amounts of the sodium and the sulfur can have good emission intensity.

In the composition formula (1), with the atomic ratio of the element R being 1, the atomic ratio y of the activating element M is preferably within the range of $0.00002<y<0.01$. The sodium-rare earth sulfide-based phosphor containing such an amount of the activating element M can have good emission intensity. When the atomic ratio y of the activating element M is 0.00002 or less and when it is 0.01 or more, the emission intensity of the phosphor reduces. The activating element M may be any of bismuth (Bi), cerium (Ce), europium (Eu), and praseodymium (Pr), or may include two kinds of the elements or more. The activating element M is preferably selected according to properties of an intended phosphor.

The phosphor of the embodiment contains a trace of oxygen (0). In the composition formula (1), with the atomic ratio of the element R being 1, the atomic ratio a of the oxygen is preferably within the range of $0.001<a<0.05$. Regulating the atomic ratio a of the oxygen to less than 0.05 makes it possible to promote the grain growth of the phosphor and increase the emission intensity of the phosphor. However, regulating the atomic ratio a of the oxygen to 0.001 or less may lead to an excessive increase in a production cost of the phosphor. Therefore, the phosphor of the embodiment contains the oxygen in an amount of more than 0.001 in terms of its atomic ratio a. Further, the phosphor of the embodiment containing such an amount of the oxygen can have increased emission luminance even if produced by a production process on a commercial mass production basis.

(Method of Producing Phosphor)

The method of producing the phosphor of the embodiment includes: a raw material preparation step of preparing a raw material mixture; a first burning step of producing a first burned product by burning the raw material mixture; and a second burning step of producing a second burned product by burning the first burned product. The phosphor of the embodiment can be produced by a production method to be described in detail below.

In the raw material preparation step, first at least one first compound selected from a group consisting of an oxide, an oxoacid, and a halide of sodium, at least one second compound selected from a group consisting of an oxide, an oxoacid, and a halide of the element R, and at least one third compound selected from a group consisting of an oxide, an oxoacid, and a halide of the element M are prepared, and a raw material mixture is prepared by mixing these compounds at such a desired ratio for the resultant phosphor to have the composition represented by the composition formula (1). Mixture ratios of the respective raw materials (first to third compounds) may be set to values slightly larger or smaller than the composition ratios indicated in the composition formula (1), in consideration of the volatilization and so on of the elements in the burning steps.

As a raw material of the sodium, at least one first compound selected from the group consisting of the oxide, the oxoacid, and the halide of the sodium is used. In the raw material of the sodium, examples of the oxoacid include a carbonate, a sulfate, and a nitrate, and it is preferable to use sodium carbonate ($Na_2CO_3$) because it is stable as a compound and can reduce a mixture amount of impurities. Examples of the halide include a fluoride, a chloride, a bromide, and an iodide, and it is preferable to use sodium fluoride (NaF) from a viewpoint of increasing reactivity and the like. As the raw material of the sodium, at least one of sodium carbonate and sodium fluoride is preferably used, and it is more preferable to use both of sodium carbonate and sodium fluoride as will be further described later.

As a raw material of the element R, at least one second compound selected from the group consisting of the oxide, the oxoacid, and the halide of the element R is used.

As the raw material of the element M, at least one third compound selected from the group consisting of the oxide, the oxoacid, and the halide of the element M is used. In the raw materials of the element R and the element M, examples of the oxoacid include a carbonate, a sulfate, and a nitrate. Examples of the halide include a fluoride, a chloride, a bromide, and an iodide. As the raw material of the element R, an oxide of the element R, such as gadolinium oxide ($Gd_2O_3$), is preferably used. As the raw material of the element M, an oxide of the element M, such as europium oxide ($Eu_2O_3$), or a carbonate of the element M, such as europium carbonate ($EuCO_3$), is preferably used.

The raw material mixture preferably contains at least one selected from a group consisting of the halide of the sodium such as sodium fluoride, the halide of the element R, and the halide of the element M. The halide such as a fluoride, if contained in the raw material mixture, can promote the crystal growth of phosphor particles. The raw material of the sodium, the element R, or the element M may be only the halide, but it is preferable to use both the oxide or oxoacid and the halide, in other words, to use the halide as part of the raw material. This can promote the crystal growth of the phosphor particles. The halide used as the raw material is preferably the halide of the sodium. That is, the raw material of the sodium preferably contains the oxoacid such as a carbonate of the sodium and the halide of the sodium such as sodium fluoride. This can promote the crystal growth of the phosphor particles as in the above.

The first burning step is a step of producing the first burned product by burning the aforesaid raw material mixture, which is filled in a boron nitride vessel, in a hydrogen sulfide atmosphere at a temperature of 1000° C. or lower. By burning the raw material mixture while it is filled in the boron nitride vessel, it is possible to reduce an amount of residual oxygen in the first burned product. For example, when the raw material mixture is burned while filled in an alumina vessel often used as a burning vessel, an amount of the residual oxygen in the first burned product becomes large, and even applying the second burning step cannot sufficiently reduce an amount of the residual oxygen. A non-oxide vessel of carbon or the like, if used, may corrode due to oxygen generated from the raw material, which will be a cause of contamination of the burned product. A quartz glass vessel, if used, may break because, for example, the vessel reacts with the halide-based raw material. The boron nitride vessel overcomes these defects of the vessels made of the other materials, making it possible to stably produce the first burned product with a small amount of the residual oxygen.

The first burning step is executed in a hydrogen sulfide atmosphere at a temperature of 1000° C. or lower. The burning temperature of over 1000° C. is likely to cause residual oxygen in the atmosphere to react with the boron nitride vessel. This will be a cause to break the vessel and increase an amount of the residual oxygen in the burned product. The burning temperature is more preferably 950° C. or lower. However, too low a burning temperature cannot cause the sufficient progress of a sulfuration reaction of the raw material mixture, and accordingly the burning temperature is preferably 800° C. or higher. The burning temperature is more preferably 850° C. or higher. The first burning step is preferably executed by burning the raw material mixture in the hydrogen sulfide atmosphere at the temperature of 1000° C. or lower for one hour or more. If the burning time is less than one hour, it may not be possible for the sulfuration reaction of the raw material mixture to sufficiently progress. The burning time is more preferably three hours or more. The upper limit of the burning time is not limited, but is preferably 24 hours or less in consideration of efficiency of the burning step.

The second burning step is a step of producing the second burned product as the intended phosphor by burning the aforesaid first burned product, which is filled in a quartz glass vessel, in a hydrogen sulfide atmosphere at a temperature of 900° C. or higher. By burning the first burned product while it is filled in the quartz glass vessel, it is possible to further remove the oxygen remaining in the first burned product. That is, it is possible to further reduce an amount of residual oxygen in the second burned product as the phosphor. The second burning step is preferably executed at a temperature higher than that in the first burning step. Specifically, it is executed at the temperature of 900° C. or higher. Even burning the first burned product at such a temperature does not cause the reaction of the vessel and so on since a reaction of, for example, the halide-based raw material in the raw material mixture has progressed in the first burning step. Using the quartz glass vessel in this state enables a further reduction in the amount of the residual oxygen in the second burned product as the phosphor as compared with a case where a vessel made of a different material is used.

The second burning step is executed in the hydrogen sulfide atmosphere at the temperature of 900° C. or higher. The burning temperature of lower than 900° C. results in a less effect of reducing the residual oxygen and cannot promote the crystal growth of the phosphor. When the first burned product is burned in the hydrogen sulfide atmosphere at the temperature of 900° C. or higher, the sodium partly reacts with hydrogen sulfide into sodium sulfide, and the sodium sulfide melts at the temperature of 900° C. or higher to act as a flux, enabling to promote the crystal growth of the phosphor. The burning temperature is more preferably 950° C. or higher. However, too high a burning temperature is likely to cause a composition deviation due to the volatilization of the sodium and so on, and accordingly the burning temperature is preferably 1100° C. or lower.

The burning temperature is more preferably 1050° C. or lower. The second burning step is preferably executed by burning the first burned product in the hydrogen sulfide atmosphere at the temperature of 900° C. or higher for one hour or more. The burning time of less than one hour results in the insufficient burning of the first burned product and may not achieve sufficient emission intensity. The burning time is more preferably three hours or more.

The upper limit of the burning time is not limited, but is preferably 24 hours or less in consideration of efficiency of the burning step.

Employing the above-described method of producing the phosphor makes it possible to produce the intended phosphor as the second burned product. Since the raw materials of the elements (Na, R, M) used in the production step are the oxide-based raw materials (oxide or oxoacid) or the halide-based raw materials relatively easily available with a relatively high purity, it is possible to inhibit a reduction in emission intensity ascribable to the mixture of impurities. Then, since the first burning step at 1000° C. or lower where the boron nitride vessel is used and the second burning step at 900° C. or higher where the quartz glass vessel is used are applied, it is possible to sufficiently reduce an amount of the residual oxygen in the phosphor (second burned product) and to promote the crystal growth of the phosphor. Therefore, it is possible to provide a sodium-rare earth sulfide-based ($Na_xRS_zO_a:M_y$) phosphor which contains the element M as the activating element, with improved emission intensity.

EXAMPLES

Next, specific examples of the present invention and their evaluation results will be described.

Comparative Example 1

$Na_2CO_3$, $Gd_2O_3$, and $Eu_2O_3$ were mixed at a molar ratio of 1.05:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a phosphor of Comparative Example 1 was obtained. The obtained phosphor was subjected to property evaluation to be described later.

Comparative Example 2

$Na_2CO_3$, NaF, $Gd_2O_3$, and $Eu_2O_3$ were mixed at a molar ratio of 0.84:0.42:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a phosphor of Comparative Example 2 was obtained. The obtained phosphor was subjected to the property evaluation to be described later.

Comparative Example 3

The phosphor of Comparative Example 1 was filled in a quartz glass boat, which was then installed in a quartz reaction tube. The mixture in this state was placed in a burning furnace, followed by burning in a hydrogen sulfide atmosphere at a temperature of 900° C. for three hours, whereby a phosphor of Comparative Example 3 was obtained. The obtained phosphor was subjected to the property evaluation to be described later.

Comparative Example 4

The phosphor of Comparative Example 2 was filled in a quartz glass boat, which was then installed in a quartz reaction tube. The mixture in this state was placed in a burning furnace, followed by burning in a hydrogen sulfide atmosphere at a temperature of 900° C. for three hours, whereby a phosphor of Comparative Example 4 was obtained. The obtained phosphor was subjected to the property evaluation to be described later.

Example 1

The phosphor of Comparative Example 1 was filled in a quartz glass boat, which was then installed in a quartz reaction tube. The mixture in this state was placed in a burning furnace, followed by burning in a hydrogen sulfide atmosphere at a temperature of 1000° C. for three hours, whereby a phosphor of Example 1 was obtained. The obtained phosphor was subjected to the property evaluation to be described later.

Example 2

The phosphor of Comparative Example 2 was filled in a quartz glass boat, which was then installed in a quartz reaction tube. The mixture in this state was placed in a burning furnace, followed by burning in a hydrogen sulfide atmosphere at a temperature of 1000° C. for three hours, whereby a phosphor of Example 2 was obtained. The obtained phosphor was subjected to the property evaluation to be described later.

Example 3

The phosphor of Comparative Example 2 was filled in a quartz glass boat, which was then installed in a quartz reaction tube. The mixture in this state was placed in a burning furnace, followed by burning in a hydrogen sulfide atmosphere at a temperature of 1100° C. for three hours, whereby a phosphor of Example 3 was obtained. The obtained phosphor was subjected to the property evaluation to be described later.

Comparative Example 5

$Na_2CO_3$, NaF, $Gd_2O_3$, and $Eu_2O_3$ were mixed at a molar ratio of 0.72:0.36:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at 1000° C. for three hours, whereby a phosphor of Comparative Example 5 was obtained. The obtained phosphor was subjected to the property evaluation to be described later.

Example 4

$Na_2CO_3$, NaF, $Gd_2O_3$, and $Eu_2O_3$ were mixed at a molar ratio of 0.76:0.38:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at 1000° C. for three hours, whereby a phosphor of Example 4 was obtained. The obtained phosphor was subjected to the property evaluation to be described later.

Example 5

$Na_2CO_3$, NaF, $Gd_2O_3$, and $Eu_2O_3$ were mixed at a molar ratio of 0.80:0.40:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 5 was obtained. The obtained phosphor was subjected to the property evaluation to be described later.

Example 6

$Na_2CO_3$, NaF, $Gd_2O_3$, and $Eu_2O_3$ were mixed at a molar ratio of 0.88:0.44:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 6 was obtained. The obtained phosphor was subjected to the property evaluation to be described later.

Comparative Example 6

$Na_2CO_3$, NaF, $Gd_2O_3$, and $Eu_2O_3$ were mixed at a molar ratio of 0.92:0.46:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Comparative Example 6 was obtained. The obtained phosphor was subjected to the property evaluation to be described later.

Comparative Example 7

$Na_2CO_3$, NaF, $Gd_2O_3$, and $Eu_2O_3$ were mixed at a molar ratio of 0.96:0.48:1.00:0.0001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Comparative Example 7 was obtained. The obtained phosphor was subjected to the property evaluation to be described later.

Example 7

$Na_2CO_3$, NaF, $Gd_2O_3$, and $Eu_2O_3$ were mixed at a molar ratio of 0.84:0.42:1.00:0.00003, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 7 was obtained. The obtained phosphor was subjected to the property evaluation to be described later.

Example 8

$Na_2CO_3$, NaF, $Gd_2O_3$, and $Eu_2O_3$ were mixed at a molar ratio of 0.84:0.42:1.00:0.001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 8 was obtained. The obtained phosphor was subjected to the property evaluation to be described later.

Example 9

$Na_2CO_3$, NaF, $Gd_2O_3$, and $Eu_2O_3$ were mixed at a molar ratio of 0.84:0.42:1.00:0.009, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 9 was obtained. The obtained phosphor was subjected to the property evaluation to be described later.

Comparative Example 8

$Na_2CO_3$, NaF, $Gd_2O_3$, and $Eu_2O_3$ were mixed at a molar ratio of 0.84:0.42:1.00:0.02, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Comparative Example 8 was obtained. The obtained phosphor was subjected to the property evaluation to be described later.

The compositions of the phosphors of the examples were analyzed and measured. Gd, S, Eu, Bi, Ce, and Pr were measured by an ICP emission spectrochemical method (SPS-3520UV manufactured by Hitachi High-Tech Science Corporation was used). Na was measured by an ICP emission spectrochemical method (IRIS Advantage manufactured by Thermo Fisher Scientific Inc. was used). 0 was measured by an inert gas fusion-infrared absorption method (TC-600 manufactured by LECO JAPAN CORPORATION was used). Table 1 shows the results. The composition of the phosphor of each of the examples is expressed as a molar ratio of each element to the element R (Gd). Next, the phosphors of the examples were each excited by an X-ray generated from a tungsten target X-ray tube under the condition of a 120 kV tube voltage and a 150 mA tube current, and their emission energies were measured. Table 1 shows the measurement results, which are expressed by relative values when emission energy of a $Gd_2O_2S{:}Pr$ phosphor for comparison excited under the same condition is defined as 100%.

TABLE 1

|  | Composition ($Na_xRM_yS_zO_a$) (R = Gd, M = Eu) | | | | Emission Intensity at the Time of X-ray Excitation |
| --- | --- | --- | --- | --- | --- |
|  | x | y | z | a | [%]*1 |
| Comparative Example 1 | 1.03 | 0.0001 | 2.01 | 0.189 | 20 |
| Comparative Example 2 | 1.03 | 0.0001 | 2.02 | 0.151 | 6 |
| Comparative Example 3 | 1.01 | 0.0001 | 2.02 | 0.059 | 35 |
| Comparative Example 4 | 1.01 | 0.0001 | 2.01 | 0.07 | 22 |
| Example 1 | 1.01 | 0.0001 | 2.01 | 0.009 | 102 |
| Example 2 | 1.00 | 0.0001 | 2.02 | 0.005 | 130 |
| Example 3 | 0.96 | 0.0001 | 2.01 | 0.005 | 110 |
| Comparative Example 5 | 0.85 | 0.0001 | 2.01 | 0.008 | 30 |
| Example 4 | 0.93 | 0.0001 | 2.03 | 0.005 | 101 |
| Example 5 | 0.95 | 0.0001 | 2.01 | 0.006 | 116 |
| Example 6 | 1.07 | 0.0001 | 2.01 | 0.005 | 122 |
| Comparative Example 6 | 1.10 | 0.0001 | 2.00 | 0.008 | 95 |
| Comparative Example 7 | 1.16 | 0.0001 | 2.00 | 0.009 | 87 |
| Example 7 | 1.01 | 0.00003 | 2.00 | 0.005 | 105 |
| Example 8 | 1.01 | 0.001 | 2.01 | 0.006 | 80 |
| Example 9 | 1.00 | 0.009 | 2.00 | 0.005 | 52 |
| Comparative Example 8 | 1.00 | 0.02 | 2.01 | 0.005 | 25 |

*1: relative value when emission intensity of $Gd_2O_2S{:}Pr$ is defined as 100 product in this state was placed in a burning furnace, followed by burning in a hydrogen sulfide atmosphere at a temperature of 1000° C. for three hours, whereby a phosphor It is seen from Table 1 that, when the activating element M is Eu, the phosphors of Examples 1 to 3 whose oxygen content is within the range of the present invention are more excellent in emission intensity than the phosphors of Comparative Examples 1 to 4 whose oxygen content is over the range of the present invention. It is also seen that the phosphors of Examples 1 to 3 whose Na content is within the range of the present invention are more excellent in emission intensity than the phosphor of Comparative Example 5 whose Na content is below the range of the present invention. It is seen that the phosphors of Examples 1 to 6 whose Na content is within the range of the present invention are more excellent in emission intensity than the phosphors of Comparative Examples 6 to 7 whose Na content is over the range of the present invention.

It is further seen that the phosphors of Examples 7 to 9 whose content of Eu being the activating element M is within the range of the present invention are more excellent in emission intensity than the phosphor of Comparative Example 8 whose Eu content is over the range of the present invention.

Example 10

$Na_2CO_3$, NaF, $Gd_2O_3$, and $Bi_2O_3$ were mixed at a molar ratio of 0.84:0.42:1.00:0.0003, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 10 was obtained. The obtained phosphor was subjected to property evaluation to be described later.

Example 11

$Na_2CO_3$, NaF, $Gd_2O_3$, and $Bi_2O_3$ were mixed at a molar ratio of 0.84:0.42:1.00:0.001, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. This was disposed in a burning furnace, followed by burning in a hydrogen sulfide atmosphere at a temperature of 1000° C. for three hours, whereby a phosphor of Example 11 was obtained. The obtained phosphor was subjected to the property evaluation to be described later.

Example 12

$Na_2CO_3$, NaF, $Gd_2O_3$, and $Bi_2O_3$ were mixed at a molar ratio of 0.84:0.42:1.00:0.003, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 12 was obtained. The obtained phosphor was subjected to the property evaluation to be described later.

Comparative Example 9

$Na_2CO_3$, NaF, $Gd_2O_3$, and $Bi_2O_3$ were mixed at a molar ratio of 0.84:0.42:1.00:0.02, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Comparative Example 9 was obtained. The obtained phosphor was subjected to the property evaluation to be described later.

The compositions of the phosphors of the examples were measured as in Example 1. Table 2 shows the results. The composition of the phosphor of each of the examples is expressed as a molar ratio of each element to the element R (Gd). Next, emission energies of the phosphors of the examples were measured under the same condition as in Example 1. Table 2 shows the measurement results, which are expressed by relative values when emission energy of a $Gd_2O_2S:Pr$ phosphor for comparison excited under the same condition is defined as 100% as in Example 1.

TABLE 2

|  | Composition ($Na_xRM_yS_zO_a$) (R = Gd, M = Bi) | | | | Emission Intensity at the Time of X-ray Excitation |
| --- | --- | --- | --- | --- | --- |
|  | x | y | z | a | [%]*1 |
| Example 10 | 1.01 | 0.0003 | 2.01 | 0.005 | 71 |
| Example 11 | 1.01 | 0.001 | 2.00 | 0.006 | 88 |
| Example 12 | 1.00 | 0.003 | 2.00 | 0.007 | 93 |
| Comparative Example 9 | 1.00 | 0.02 | 2.01 | 0.005 | 53 |

*1: relative value when emission intensity of $Gd_2O_2S:Pr$ is defined as 100

It is seen from Table 2 that, when the activating element M is Bi, the phosphors of Examples 10 to 12 whose Bi content is within the range of the present invention are more excellent in emission intensity than the phosphor of Comparative Example 9 whose Bi content is over the range of the present invention.

Example 13

$Na_2CO_3$, NaF, $Gd_2O_3$, and $CeO_2$ were mixed at a molar ratio of 0.84:0.42:1.00:0.0006, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 13 was obtained. The obtained phosphor was subjected to property evaluation to be described later.

Example 14

$Na_2CO_3$, NaF, $Gd_2O_3$, and $CeO_2$ were mixed at a molar ratio of 0.84:0.42:1.00:0.002, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 14 was obtained. The obtained phosphor was subjected to the property evaluation to be described later.

Example 15

$Na_2CO_3$, NaF, $Gd_2O_3$, and $CeO_2$ were mixed at a molar ratio of 0.84:0.42:1.00:0.003, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 15 was obtained. The obtained phosphor was subjected to the property evaluation to be described later.

Example 16

$Na_2CO_3$, NaF, $Gd_2O_3$, and $CeO_2$ were mixed at a molar ratio of 0.84:0.42:1.00:0.01, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 16 was obtained. The obtained phosphor was subjected to the property evaluation to be described later.

Comparative Example 10

$Na_2CO_3$, NaF, $Gd_2O_3$, and $CeO_2$ were mixed at a molar ratio of 0.84:0.42:1.00:0.03, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Comparative Example 10 was obtained. The obtained phosphor was subjected to the property evaluation to be described later.

The compositions of the phosphors of the examples were measured as in Example 1. Table 3 shows the results. The composition of the phosphor of each of the examples is expressed as a molar ratio of each element to the element R (Gd). Next, emission energies of the phosphors of the examples were measured under the same condition as in Example 1. Table 3 shows the measurement results, which are expressed by relative values when emission energy of a $Gd_2O_2S$:Pr phosphor for comparison excited under the same condition is defined as 100%, as in Example 1.

TABLE 3

|  | Composition ($Na_xRM_yS_zO_a$) (R = Gd, M = Ce) | | | | Emission Intensity at the Time of X-ray Excitation |
| --- | --- | --- | --- | --- | --- |
|  | x | y | z | a | [%]*1 |
| Example 13 | 1.00 | 0.0003 | 2.02 | 0.005 | 40 |
| Example 14 | 1.00 | 0.001 | 2.01 | 0.004 | 42 |
| Example 15 | 1.02 | 0.0015 | 2.00 | 0.008 | 48 |
| Example 16 | 1.00 | 0.005 | 2.02 | 0.005 | 48 |
| Comparative Example 10 | 1.03 | 0.015 | 2.01 | 0.005 | 27 |

*1: relative value when emission intensity of $Gd_2O_2S$:Pr is defined as 100

It is seen from Table 3 that, when the activating element M is Ce, the phosphors of Examples 13 to 16 whose Ce content is within the range of the present invention are more excellent in emission intensity than the phosphor of Comparative Example 10 whose Ce content is over the range of the present invention.

Example 17

$Na_2CO_3$, NaF, $Gd_2O_3$, and $Pr_6O_{11}$ were mixed at a molar ratio of 0.84:0.42:1.00:0.00018, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 17 was obtained. The obtained phosphor was subjected to property evaluation to be described later.

Example 18

$Na_2CO_3$, NaF, $Gd_2O_3$, and $Pr_6O_{11}$ were mixed at a molar ratio of 0.84:0.42:1.00:0.00055, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 18 was obtained. The obtained phosphor was subjected to the property evaluation to be described later.

Example 19

$Na_2CO_3$, NaF, $Gd_2O_3$, and $Pr_6O_{11}$ were mixed at a molar ratio of 0.84:0.42:1.00:0.0018, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 19 was obtained. The obtained phosphor was subjected to the property evaluation to be described later.

Example 20

$Na_2CO_3$, NaF, $Gd_2O_3$, and $Pr_6O_{11}$ were mixed at a molar ratio of 0.84:0.42:1.00:0.0028, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 20 was obtained. The obtained phosphor was subjected to the property evaluation to be described later.

Example 21

$Na_2CO_3$, NaF, $Gd_2O_3$, and $Pr_6O_{11}$ were mixed at a molar ratio of 0.84:0.42:1.00:0.0064, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 21 was obtained. The obtained phosphor was subjected to the property evaluation to be described later.

Example 22

$Na_2CO_3$, NaF, $Gd_2O_3$, and $Pr_6O_{11}$ were mixed at a molar ratio of 0.84:0.42:1.00:0.0092, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 22 was obtained. The obtained phosphor was subjected to the property evaluation to be described later.

Example 23

$Na_2CO_3$, NaF, $Gd_2O_3$, and $Pr_6O_{11}$ were mixed at a molar ratio of 0.84:0.42:1.00:0.016, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Example 23 was obtained. The obtained phosphor was subjected to the property evaluation to be described later.

Comparative Example 11

$Na_2CO_3$, NaF, $Gd_2O_3$, and $Pr_6O_{11}$ were mixed at a molar ratio of 0.84:0.42:1.00:0.028, and the mixture was filled in a boron nitride crucible, which was then installed in a quartz reaction tube. The mixture in this state was placed in a burning furnace, followed by burning in a hydrogen sulfide atmosphere at a temperature of 900° C. for three hours, whereby a first burned product was obtained. The first burned product was filled in a quartz glass boat, which was then installed in a quartz reaction tube. The first burned product in this state was placed in a burning furnace, followed by burning in a hydrogen sulfide atmosphere at a temperature of 1000° C. for three hours, whereby a phosphor of Comparative Example 11 was obtained. The obtained phosphor was subjected to the property evaluation to be described later.

The compositions of the phosphors of the examples were measured as in Example 1. Table 4 shows the results. The composition of the phosphor of each of the examples is expressed as a molar ratio of each element to the element R (Gd). Next, emission energies of the phosphors of the examples were measured under the same condition as in Example 1. Table 4 shows the measurement results, which are expressed by relative values when emission energy of a $Gd_2O_2S$:Pr phosphor for comparison excited under the same condition is defined as 100% as in Example 1.

TABLE 4

| | Composition ($Na_xRM_yS_zO_a$) (R = Gd, M = Pr) | | | | Emission Intensity at the Time of X-ray Excitation |
|---|---|---|---|---|---|
| | x | y | z | a | [%]*1 |
| Example 17 | 1.01 | 0.0001 | 2.03 | 0.009 | 78 |
| Example 18 | 1.01 | 0.0003 | 2.06 | 0.005 | 87 |
| Example 19 | 1.03 | 0.001 | 2.01 | 0.007 | 106 |
| Example 20 | 1.00 | 0.0015 | 2.02 | 0.005 | 96 |
| Example 21 | 1.01 | 0.0035 | 2.01 | 0.005 | 78 |
| Example 22 | 1.02 | 0.005 | 2.00 | 0.006 | 68 |
| Example 23 | 1.01 | 0.009 | 2.00 | 0.008 | 63 |
| Comparative Example 11 | 1.03 | 0.015 | 2.02 | 0.005 | 38 |

*1: relative value when emission intensity of $Gd_2O_2S:Pr$ is defined as 100

It is seen from Table 4 that, when the activating element M is Pr, the phosphors of Examples 17 to 23 whose Pr content is within the range of the present invention are more excellent in emission intensity than the phosphor of Comparative Example 11 whose Pr content is over the range of the present invention.

Particle size measurement of the phosphors of the above-described Examples by laser diffractometry has led to the confirmation that all of them have a favorable particle size. Incidentally, the phosphors of the above-described Examples have Gd as the element R, but a phosphor whose element R is Y, La, or Lu belonging to the same element group as Gd also can have improved emission intensity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A phosphor comprising a composition represented by a composition formula:

where R represents at least one element selected from the group consisting of Y, La, Gd, and Lu, M represents at least one element selected from the group consisting of Bi, Ce, Eu, and Pr, x is an atomic ratio satisfying 0.93<x<1.07, y is an atomic ratio satisfying 0.00002<y<0.01, z is an atomic ratio satisfying 1.9<z<2.1, and a is an atomic ratio satisfying 0.001<a<0.05.

2. The phosphor according to claim 1, wherein the element R in the composition formula contains Gd.

3. The phosphor according to claim 1, wherein the element M in the composition formula contains Eu.

4. A method of producing the phosphor according to claim 1, the method comprising:

preparing a raw material mixture by mixing at least one first compound selected from the group consisting of an oxide, an oxoacid, and a halide of sodium, at least one second compound selected from the group consisting of an oxide, an oxoacid, and a halide of the element R, and at least one third compound selected from the group consisting of an oxide, an oxoacid, and a halide of the element M, at such a desired ratio for the resultant phosphor to have the composition represented by the composition formula;

producing a first burned product by burning the raw material mixture, which is filled in a boron nitride vessel, in a hydrogen sulfide atmosphere at a temperature of 1000° C. or lower; and producing a second burned product as the phosphor by burning the first burned product, which is filled in a quartz glass vessel, in a hydrogen sulfide atmosphere at a temperature that is equal to or higher than 900° C. and is higher than the burning temperature of the first burning.

5. The method according to claim 4, wherein the raw material mixture contains at least one selected from the group consisting of the halide of the sodium, the halide of the element R, and the halide of the element M.

6. The method according to claim 4, wherein at least one selected from the first compound, the second compound, and the third compound contains the oxide or oxoacid and the halide.

7. The method according to claim 4, wherein the raw material mixture contains the oxoacid of the sodium, the halide of the sodium, the oxide of the element R, and the oxide or oxoacid of the element M.

8. The method according to claim 7, wherein the oxoacid of the sodium is sodium carbonate, and the halide of the sodium is sodium fluoride.

9. The method according to claim 4, wherein the raw material mixture is burned at a temperature of not lower than 800° C. nor higher than 1000° C.

10. The method according to claim 4, wherein the first burned product is burned at a temperature of not lower than 900° C. nor higher than 1100° C.

11. The method according to claim 4, wherein a burning time of the raw material mixture is one hour or more, and a burning time of the first burned product is one hour or more.

* * * * *